Figure 5:
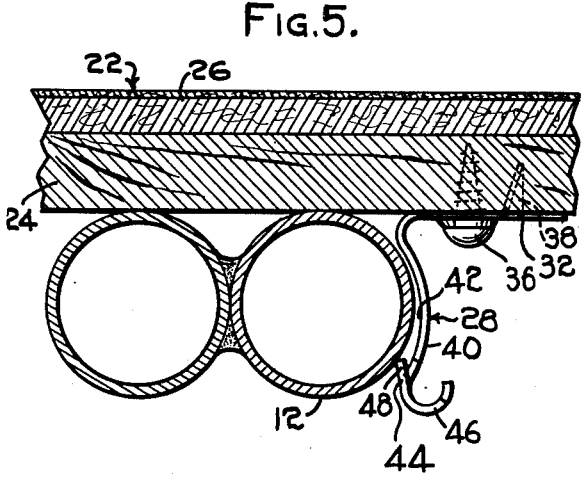
Figure 6:
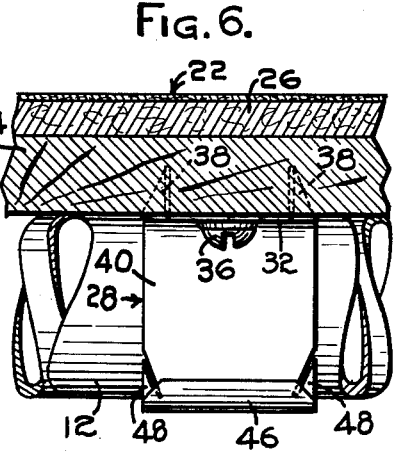
Figure 7:
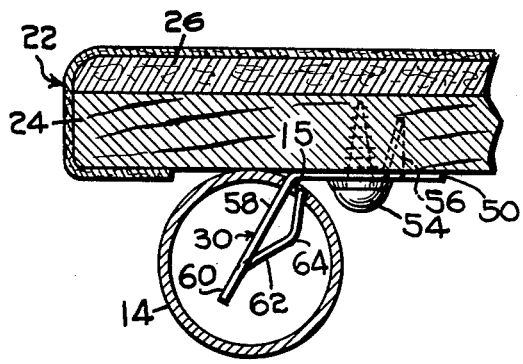
Figure 8:
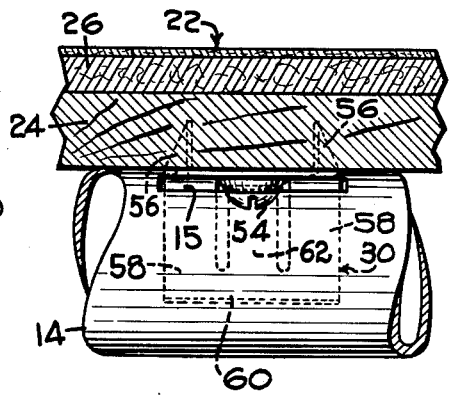

March 8, 1955
P. D. BECKER
2,703,604
FURNITURE ASSEMBLY AND FASTENING
DEVICE FOR USE THEREIN
Filed Oct. 10, 1952
2 Sheets-Sheet 1
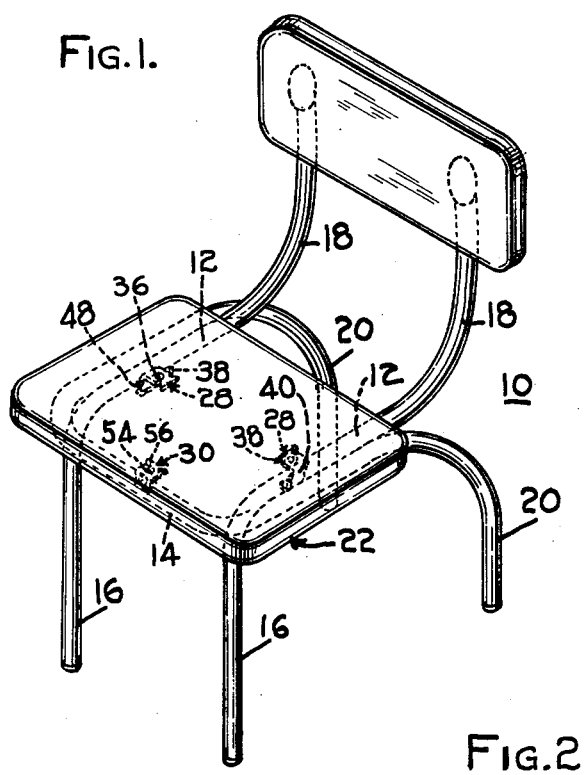
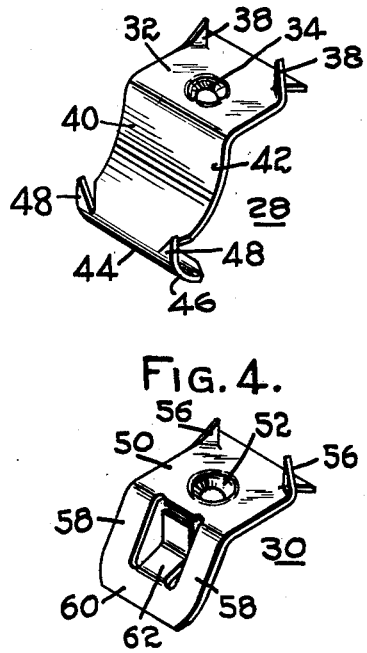
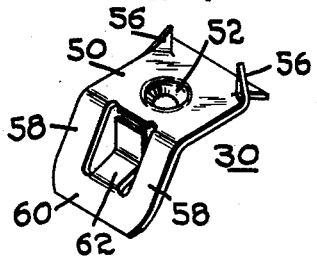
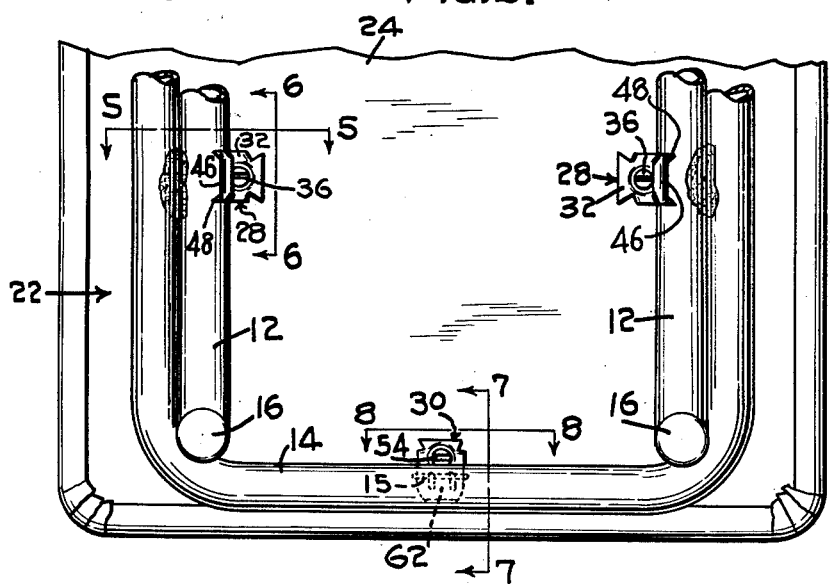
INVENTOR:
PHILIP D. BECKER,
BY Robert E Ross
ATTORNEY.

March 8, 1955

P. D. BECKER 2,703,604

FURNITURE ASSEMBLY AND FASTENING
DEVICE FOR USE THEREIN

Filed Oct. 10, 1952

2 Sheets-Sheet 2

INVENTOR:
PHILIP D. BECKER,
BY Robert E Ross
ATTORNEY.